(12) United States Patent
Kamiyama et al.

(10) Patent No.: US 6,487,153 B2
(45) Date of Patent: Nov. 26, 2002

(54) SYSTEM FOR DISCRIMINATING OPTICAL DISCS

(75) Inventors: Hideyo Kamiyama, Saitama-ken (JP); Akira Kawakami, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/987,011

(22) Filed: Nov. 13, 2001

(65) Prior Publication Data

US 2002/0031072 A1 Mar. 14, 2002

Related U.S. Application Data

(62) Division of application No. 09/597,539, filed on Jun. 19, 2000, now Pat. No. 6,327,234, which is a continuation of application No. 08/869,741, filed on Jun. 5, 1997, now abandoned.

(30) Foreign Application Priority Data

Jun. 11, 1996 (JP) .............................. 8-171890

(51) Int. Cl.⁷ ................................ G11B 7/00
(52) U.S. Cl. ............................ 369/53.23; 369/44.27; 369/53.37
(58) Field of Search ............... 369/53.2, 53.22, 369/53.23, 53.37, 44.27, 94

(56) References Cited

U.S. PATENT DOCUMENTS

| | | | |
|---|---|---|---|
| 4,850,695 A | 7/1989 | Mikuriya et al. ............ 356/237 |
| 5,446,565 A | 8/1995 | Komma et al. ................ 369/19 |
| 5,511,050 A | 4/1996 | Matsumoto et al. ..... 369/44.23 |
| 5,665,957 A | * 9/1997 | Lee et al. ................ 369/53.23 |
| 5,724,325 A | 3/1998 | Jeong ....................... 369/44.27 |
| 5,754,507 A | 5/1998 | Nishikata .................. 369/44.29 |
| 5,757,745 A | 5/1998 | Takeya ........................ 369/58 |
| 5,790,493 A | 8/1998 | Takeya et al. ................ 369/58 |
| 6,240,054 B1 | * 5/2001 | Takeya et al. ........... 369/53.37 |

FOREIGN PATENT DOCUMENTS

| | | |
|---|---|---|
| EP | 0 767 455 A2 | 4/1997 |
| GB | 2 304 226 A | 3/1997 |

OTHER PUBLICATIONS

Patent Abstract of Japan, vol. 17, No. 366, (P–1571), Jul. 9, 1993 & JP 05 054406 (Matsushita Electric Ind. Co. Ltd), Mar. 5, 1993.

Patent Abstract of Japan, vol. 095, No. 003, Apr. 28, 1995 & JP 06 333225 (Matsushita Electric Ind. Co. Ltd), Dec. 2, 1994

Patent Abstract of Japan, vol. 97, No. 003, Mar. 31, 1997 & JP 08 306056 (Sanyo Electric Co. Ltd), Nov. 22, 1996.

Patent Abstract of Japan, vol. 97, No. 001, Jan. 31, 1997 & JP 08 249801 (Pioneer Electron Corp.), Sep. 27, 1996.

* cited by examiner

Primary Examiner—Thang V. Tran
(74) Attorney, Agent, or Firm—Arent Fox Kintner Plotkin & Kahn

(57) ABSTRACT

A laser beam is focused at positions on an optical axis of the optical pickup by a focusing device, corresponding to kinds of the discs which are different in thickness. The focusing device is moved along the optical axis. A photodetector is provided for receiving a laser beam reflected from the disc and for producing a focus error signal. A detector is provided for detecting the difference between the focus error signals, caused by the difference in thickness of the discs and the difference in focal point of the laser beam, thereby discriminating the kind of the disc.

2 Claims, 9 Drawing Sheets

SYSTEM FOR DISCRIMINATING OPTICAL DISCS

This is a Division of application Ser. No. 09/597,539 filed Jun. 19, 2000, (which in turn is a Continuation Application of parent application Ser. No. 08/869,741) filed Jun. 5, 1997 (now abandoned). The disclosure of the prior application is hereby incorporated by reference herein in its entirety.

BACKGROUND OF THE INVENTION

The present invention relates to an optical disc discriminating system in an optical disc player for discriminating various kinds of optical discs such as CD and DVD (Digital Video Disc or Digital Versatile Disc).

A compatible single optical disc player which is capable of reproducing a CD (compact disc) and a LD (laser disc) has been popular. Since the thickness of the CD and the LD from the rear surface to the recording surface is the same (1.2 mm), it is possible to use an optical pickup in which a laser beam is focused on a focal point for reproducing both of the CD and the LD.

In order to discriminate the kind of the disc mounted on the player, the diameter of the disc is detected for discriminating the CD or the video disc.

Recently, the DVD having a high recording density has been developed. Although the thickness of the CD from the surface to the recording surface is 1.2 mm, the thickness of the DVD is about 0.6 mm. However, the principle of a reading system of recording pits of the DVD is the same as that of the CD. Therefore, a compatible single optical disc player which is capable of reproducing the CD and the DVD has greatly been proposed.

In such a compatible CD/DVD player, in order to properly focus the beam for reading the information on the recording surface of the disc, two types of lenses are provided, each having a focal length suitable for a thickness of a corresponding disc. As another type of the compatible CD/DVD player, a double focus lens using a hologram element is provided.

FIG. 8a shows an optical pickup having a double focus lens using a hologram element (diffraction grating).

The double focus lens comprises a diffraction grating 13, an objective lens 11 disposed on the same optical path, and a collimator lens 14. A beam of light is paralleled by the collimator lens 14 and divided into three spectral beams of 0 order spectrum (having a 90 diffraction angle) and ±1 order spectrum by the diffraction grating 13 (−1 order spectrum is not shown). Since focal lengths of the 0 order spectrum and the +1 order spectrum are different from each other, each of the 0 order spectrum (hereinafter called zero-order spectrum) and the +1 order spectrum (hereinafter called first-order spectrum) is focused on a different position of the same line.

Concretely, the zero-order spectrum is properly focused on the recording surface of the DVD, while the first-order spectrum is properly focused on the recording surface of the CD.

In operation, when the pickup is gradually moved away from the disc, the recording surface is irradiated with the zero-order spectrum first. A four-divided photodetector provided in the pickup (not shown) produces an S-shaped signal as a focus error signal. When the pickup is further moved away, the first-order spectrum reflected from the disc passes an optical path of the zero-order spectrum, thereby forming a pseudo spectrum. Thus, a pseudo S-shaped signal of the pseudo spectrum is produced. Finally, an S-shaped signal of the first-order spectrum is produced as a focus error signal.

FIG. 8b shows S shaped signals of the corresponding zero-order spectrum, pseudo spectrum, and first-order spectrum with respect to the movements of the double focus lens of FIG. 8a. The spectral ratio of the zero-order spectrum and the first-order spectrum is set to 1:1.

As aforementioned, the zero-order spectrum achieves the optimum focus on the DVD, while the first-order spectrum achieves the optimum focus on the CD. If the amount of the S-shaped signal by the zero-order spectrum on the DVD is 100%, the amount of the signal corresponding to the CD is small, less than 100%. Similarly, if the amount of the S-shaped signal by the first-order spectrum on the CD is 100%, the amount of the signal corresponding to the DVD is small, less than 100%. Thus, in the double focus lens, the amplitudes of the respective focus error signals are different from each other. The ratio of zero-order spectrum to first-order spectrum of the DVD, namely zero-order spectrum/first-order spectrum is larger than the ratio of zero-order spectrum to first-order spectrum of the CD, that is zero-order spectrum/first-order spectrum.

In the compatible CD/DVD player, a focus servo control system is provided for each disc. In a focus servo control, the pickup is vertically moved against the disc, and a focus error (FE) signal is produced for detecting a proper focal point for focusing in. However, in the aforementioned player using the double focus lens, a plurality of focus error signals (S-shaped signals by zero-order spectrum, pseudo spectrum and first-order spectrum) are obtained. Accordingly, a problem that focusing in is achieved by an S-shaped signal detected first arises. In other words, there may be occur an erroneous focusing by an improper spectrum.

SUMMARY OF THE INVENTION

An object of the present invention is to provide an optical disc discriminating system for an optical disc player which may properly discriminate a CD and a DVD, and select an optimum S-shaped signal in a focus error signal for focusing in.

According to the present invention, there is provided a system for discriminating various kinds of optical discs which are different in thickness, in an optical disc player having an optical pickup, comprising focusing means for focusing a laser beam at positions on an optical axis of the optical pickup, the number of the positions being corresponded to the number of kinds of the discs, moving means for moving the focusing means along the optical axis, photodetector means for receiving a laser beam reflected from the disc and for producing a focus error signal, detector means for detecting the difference between the focus error signals, caused by the difference in thickness of the discs and the difference in focal point of the laser beam, and for discriminating the kind of the disc.

The focusing means comprises a diffraction grating and an objective lens.

The detector means detects the difference in level of the focus error signal.

In another aspect of the invention, the detector means detects the difference in timing of production of the focus error signal.

In a further aspect, the detector means detects the difference in position of the focusing means when the focus error signal is produced.

These and other objects and features of the present invention will become more apparent from the following detailed description with reference to the accompanying drawings.

DETAILED DESCRIPTION OF THE PREFERRED EMBODIMENTS

Figure 1:
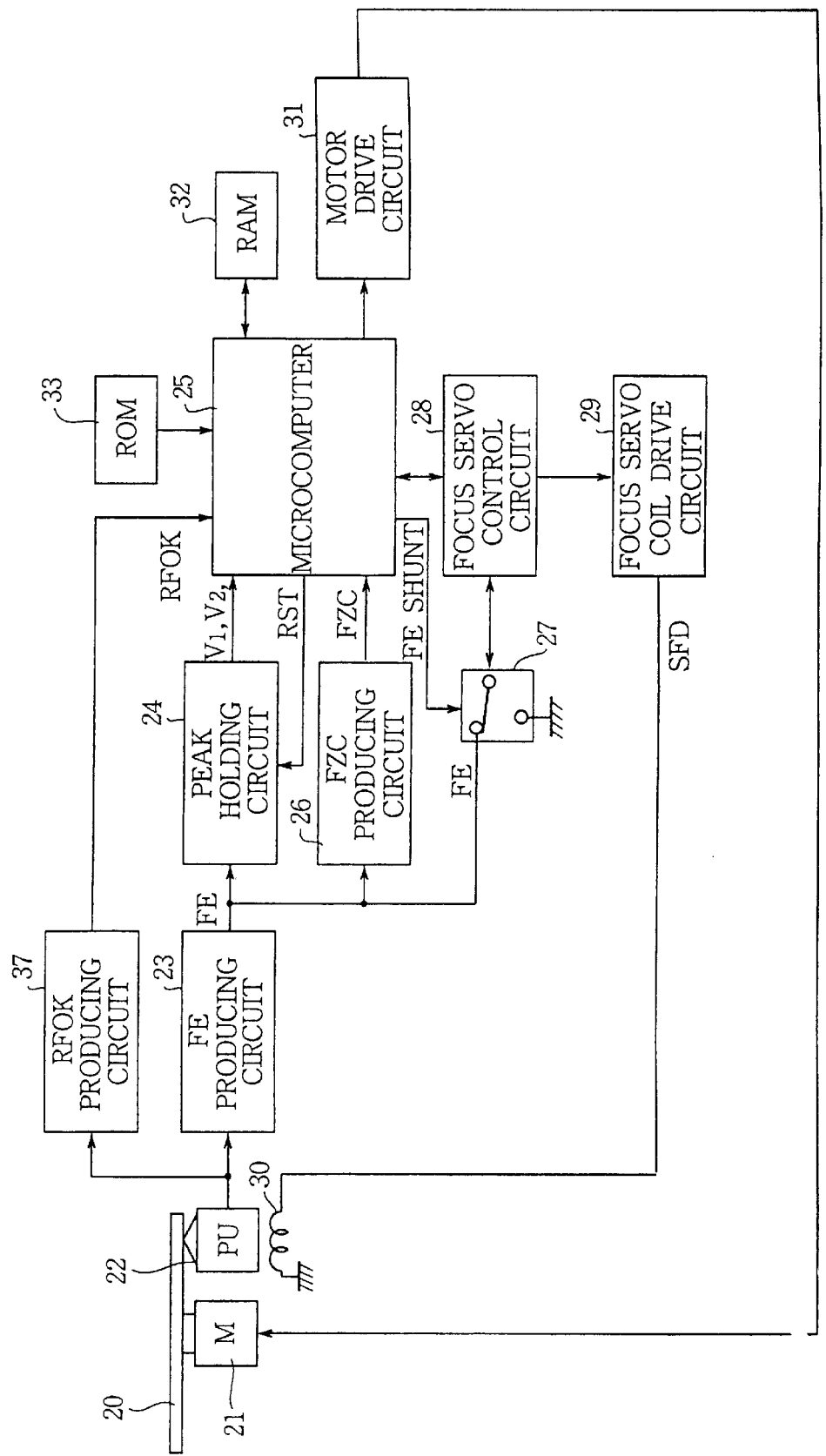
FIG. 1 is a block diagram showing an optical disc discriminating system according to the present invention.
Figure 8A:
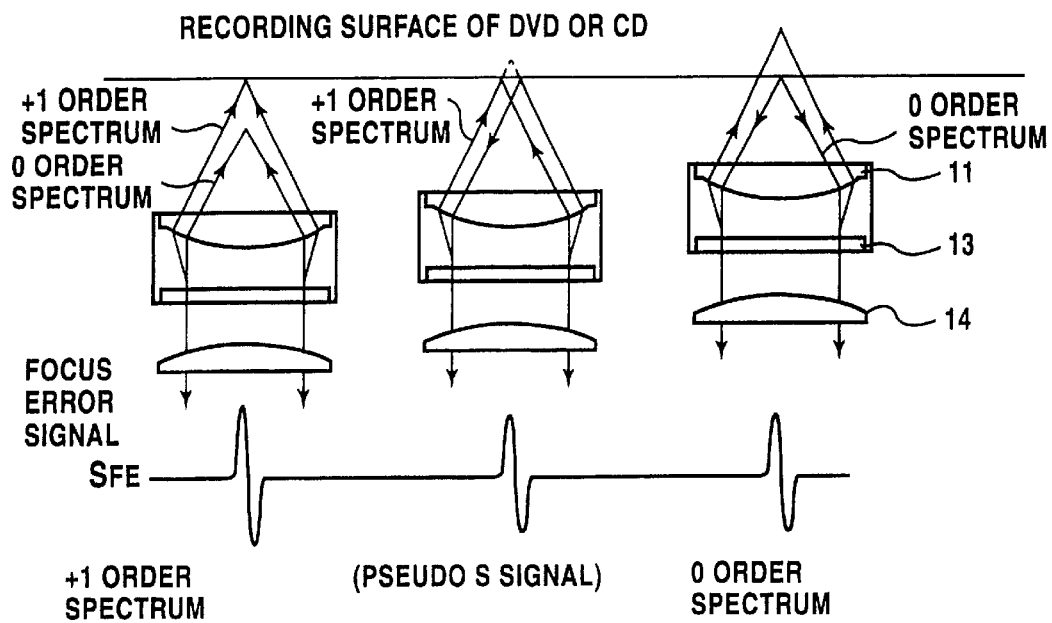
FIGS. 8a and 8b are diagrams showing the principle of the system using a hologram element as double focus lens.
Figure 8B:
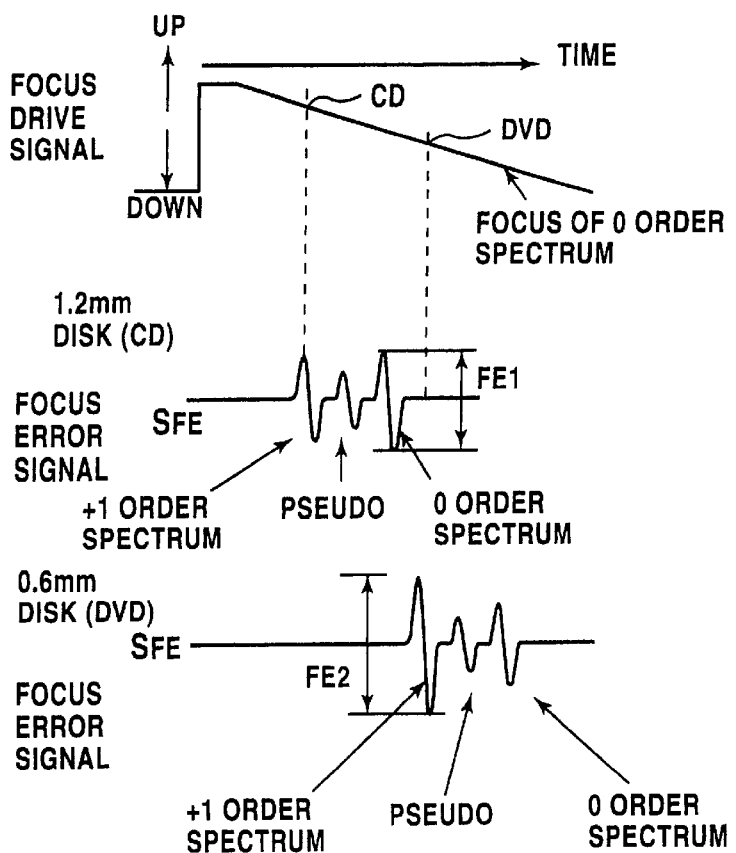

Referring to FIG. 1 showing a system of a CD/DVD player according to the present invention, an optical disc 20 to be reproduced is mounted on the player and rotated by a spindle motor 21. An optical pickup 22 has a double focus lens which has the same principle as FIG. 8a. The pickup 22 emits a laser beam, and pits formed on a recording surface of the disc 20 is irradiated with the beam for reading information recorded with the pits.

An output signal of the pickup 22 is fed to a focus error (FE) producing circuit 23. The FE producing circuit 23 produces a focus error signal. After removing an unnecessary signal of a high frequency range from the focus error signal, the focus error signal is applied to a peak holding circuit 24. The peak holding circuit 24 holds the maximum amplitude voltage of the positive pole side of the focus error signal as a peak voltage at a substantially constant value. The peak holding circuit 24 applies the peak voltage to a microcomputer 25.

The microcomputer 25 produces a reset (RST) signal which is applied to the peak holding circuit 24 for resetting the maximum voltage held in the circuit. When a next focus error signal is applied to the peak holding circuit 24, a maximum amplitude voltage of the positive pole side of the next focus error signal is held as the maximum voltage.

The output signal from the pickup 22 is further applied to an RFOK producing circuit 37. The RFOK producing circuit 37 receives an added signal of a four-divided photodetector. When the added focus signal exceeds a predetermined threshold value, the RFOK producing circuit 37 produces an RFOK signals which is applied to the microcomputer 25. Namely, the production of the RFOK signal means the laser beam is located at a position near focused position.

The focus error signal from the FE producing circuit 23 is further applied to a focus zero cross (FZC) producing circuit 26. The FZC producing circuit 26 is a zero cross comparator comprising an operational amplifier and produces a focus zero cross detecting signal in the form of pulses. The production of the FZC signal means that the spectrum is focused. The FZC signal is applied to the microcomputer 25.

The focus error signal from the FE producing circuit 23 is also applied to a fixed contact of a loop switch 27. The loop switch 27 is operated by an FE shunt signal from the microcomputer 25.

A movable contact of the loop switch 27 is connected to a focus servo control circuit 28 which is connected to the microcomputer 25. The focus servo control circuit 28 is further connected to a focus servo coil drive circuit 29 which is connected to an actuator coil 30.

When the loop switch is closed (ON-state), a focus servo loop comprising the FE producing circuit 23, microcomputer 25, focus servo control circuit 28, focus servo coil drive circuit 29 and actuator coil 30 is closed. Thus, the focus error signal is applied to the focus servo controller 28 for automatically controlling the focus servo.

When the loop switch 27 is opened (OFF-state), the microcomputer 25 operates the focus servo coil drive circuit 29 to produce the drive voltage for driving the actuator coil 30. Thus, the lens in the pickup is moved downward and upward at a predetermined speed for discriminating the disc.

The microcomputer 25 is further connected to a RAM 32, a ROM 33 and a motor drive circuit 31. The RAM 32 stores data of signals (time and voltage) detected by circuits, and set values obtained by the detected signals. The ROM 33 stores data of set values necessary for the system. The motor drive circuit 31 produces a it drive signal for driving the spindle motor 21.

Figure 2:
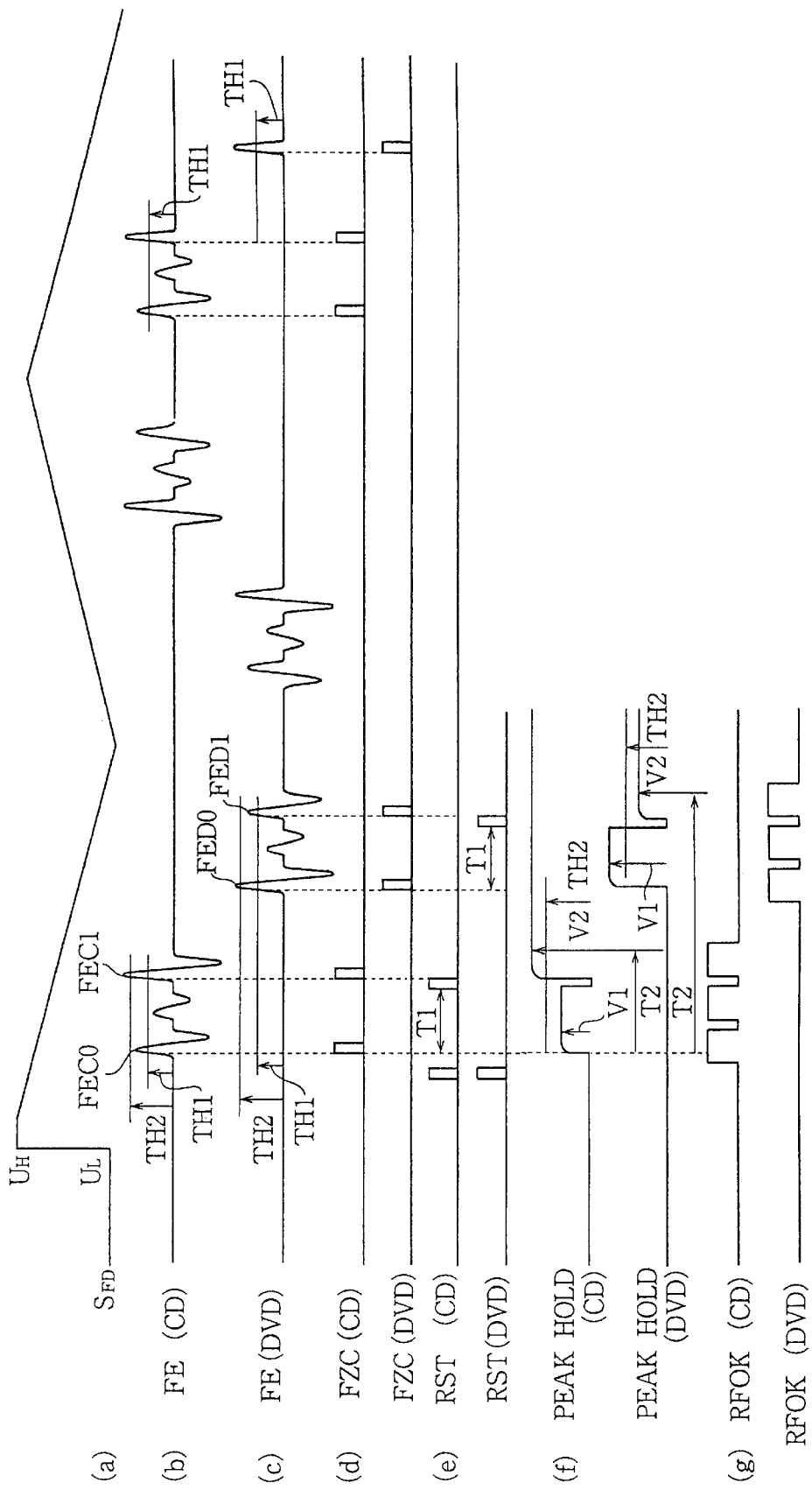
FIGS. 2a to 2g are time charts showing signals for explaining an operation of the system.

FIGS. 2a to 2g show time charts of signals for explaining the operation of the system. As aforementioned, the double focus lens in the pickup 22 has the same principle as FIG. 8a, and the spectral ratio of the zero-order spectrum and the first-order spectrum is 1:1. Thus, when the lens is vertically moved, the relationship between the maximum amplitudes of the S-shaped signals of zero-order spectrum and first-order spectrum is represented as follows.

$$(FED0/FED1) > (FEC0/FEC1)$$

where FED0: Maximum Amplitude Voltage of the S-shaped signal of the DVD by the zero-order spectrum FED1: Maximum Amplitude Voltage of the S-shaped signal of the DVD by the first-order spectrum FEC0: Maximum Amplitude Voltage of the S-shaped signal of the CD by the zero-order spectrum FEC1: Maximum Amplitude Voltage of the S-shaped signal of the CD by the first-order spectrum FIG. 2a shows a focus drive voltage SFD for representing a position voltage of the lens. A mark UH is the highest position of the lens (the closest position of the lens to the optical disc 20), and a mark UL is the lowest position of the lens (the farthest position of the lens from the disc).

FIGS. 2b and 2c show voltages of the focus error signals (FE) having S shape for the CD and the DVD, respectively, obtained during the upward and downward movements of the lens. A mark TH1 is a threshold of the voltage stored in the ROM 33 for detecting the S-shaped signal. The TH1 is set at least smaller than the maximum amplitude voltages obtained by the zero-order spectrum of the CD and DVD. The FZC signal is produced by comparing with the TH1. A mark TH2 is a threshold set to a value between the maximum amplitude voltage of the S-shaped signal of the CD by the first-order spectrum FEC1 and the maximum amplitude voltage of the S-shaped signal of the DVD by the first-order spectrum FED1 (FEC1>TH2>FED1). The TH2 is stored in the ROM 33 or obtained by multiplying the S-shaped signal by the zero-order spectrum and a coefficient together. In this state, influence of the reflectance of the disc is prevented.

FIG. 2d shows the zero cross detecting pulse signal FZC for each of CD and DVD obtained by the FZC producing circuit 26 when the zero cross of the S-shaped signal is detected.

FIG. 2e shows the reset pulse signal RST for each of CD and DVD applied from the microcomputer 25. FIG. 2f shows output signals of the peak voltages from the peak holding circuit 24 for CD and DVD. A mark V1 is a waveform and a measured point of the maximum amplitude voltage of the S-shaped signal by the zero-order spectrum. A mark V2 is a waveform and a measured point of the maximum amplitude voltage of the S-shaped signal by the first-order spectrum.

In FIGS. 2e and 2f, marks T1 and T2 are times measured by a timer provided in the microcomputer 25. As shown in FIG. 2e, the time T1 represents the time when the peak voltage is reset after the peak voltage of the zero-order spectrum is measured by the FZC formed by the S-shaped signal of the zero-order spectrum. For example, if the pseudo S-shaped signal is large, and if the time is set to the middle between the pseudo spectrum and the first-order spectrum after the peak voltage is measured to pass the pseudo S-shaped signal, the pseudo S-shaped signal is masked. The time T2 represents the time passing the first-order spectrum from the FZC and measuring the peak voltage of first-order spectrum, or the time until the lens reaches the lowest position UL.

FIG. 2g shows the RFOK signal of each of CD and DVD, which will be described hereinafter.

The operation of the system will be described with reference to the flowchart of FIG. 3.

At a step S1, the optical disc 20 is loaded on the disc player. At a step S2, the loop switch 27 is opened (OFF-state), and the double focus lens in the pickup 22 is moved up to the highest position UH. At a step S3, the peak voltage is reset, and the lens is moved down from the highest position UH to the lowest position UL at a predetermined set speed. During the downward movement of the lens, the pickup 22 produces the focus error signal.

At a step S4, the maximum voltage of the FE of the S-shaped signal is monitored by the FZC signal if the FE exceeds the threshold TH1. When FE≧TH1, the timer is set at a step S5. At a step S6, the peak voltage of the positive pole side of the S-shaped signal obtained first by the peak holding circuit 24 for a predetermined time is stored in the RAM 32 as the peak voltage V1. At a step S7, a time T measured by the timer is compared with the set time T1 stored in the ROM 33. If T≧T1, the microcomputer 25 applies the reset signal RST to the peak holding circuit 24 for discharging the peak voltage V1 held therein to be zero at a step S8. If not at the step S7, the timer is set until T≧T1 is obtained.

At a step S9, the measured time T is compared with the set time T2 stored in the ROM 33. If T≧T2, when the timer counts the time T2 at a step S10, the peak voltage held in the peak holding circuit 24 is stored in the RAM 32 as the peak voltage V2. AT a step 11, the peak voltage V2 is compared with the threshold TH2 stored in the ROM 33. If V2≧TH2, it is determined that the disc 20 is CD at a step S13. If not, it is determined that the disc 20 is DVD at a step S12.

At a step S14, the position of the lens is monitored until SFD≧UL. When SFD≧UL, the timer is reset at a step S15. At a step S16, the lens is moved up. At a step S17, the position of the lens is monitored until SFD≧UH. When SFD≧UH, the lens is moved down at a step S18. At a step S19, the S-shaped signal obtained first is monitored by the FZC until the FE exceeds the threshold TH1. When FE≧TH1, and when it is determined that the disc determined at the step 11 is CD at a step S20, the timer is set at a step S21. If the disc is DVD at the step S20, the program goes to a step S23.

At a step S22, the measured time T is monitored until T≧T1. When T≧T1, the microcomputer 25 is operated to close the loop switch 27 at the step S23. At a step S24, when the zero cross signal FZC is produced, it is determined that the laser beam is focused. At a step S25, a series operation for disc discrimination is terminated.

In the step S11, although the disc is discriminated by V2≧TH2, there is another method for discriminating the disc.

As aforementioned, since (FEC0/FEC1)<(FED0/FED1), the disc may be discriminated by the peak voltages V1 and V2 of the peak holding circuit 24. If a certain value β is set to (FEC0/FEC1)<β<(FED0/FED1), and the disc is discriminated with the value β, the disc can be discriminated without influenced by the reflectance of the disc.

Namely, as shown in FIG. 2f, if the peak voltage of the S-shaped signal by the zero-order spectrum is V1 and the peak voltage of the S-shaped signal by the first-order spectrum is V2, it is determined whether V2×β>V1 at the step S11. When V2×β>V1, it is determined the disc is CD at the step S13. If not, it is determined the disc is DVD at the step S12.

FIG. 2g shows the RFOK signal of each of CD and DVD.

In the embodiment, timings for starting the measurement of times T1 and T2 may be determined by the RFOK signals, not the FZC of the zero-order spectrum. Furthermore, it is possible to determine the timings when the peak voltage output exceeds the TH1.

The lens may be moved from the lowest position to the highest position. In this method, although the S-shaped signal becomes the order of first-order spectrum, pseudo spectrum and zero-order spectrum, it is possible to discriminate the disc in the same manner.

In the above described embodiment, it is possible that when the maximum voltage V2 is detected, it is determined that the lens is positioned at the lowermost position, or may be moved to the uppermost position.

Although the timing for resetting the focus is set to the middle between the pseudo S-shaped signal and the S-shaped signal by the first-order spectrum, it is possible to reset after the V1 is measured if the pseudo S-shaped signal is small.

In order to prevent the influence of the recording surface of the disc, the disc may be rotated at a predetermined speed at the step S2.

Figure 4:
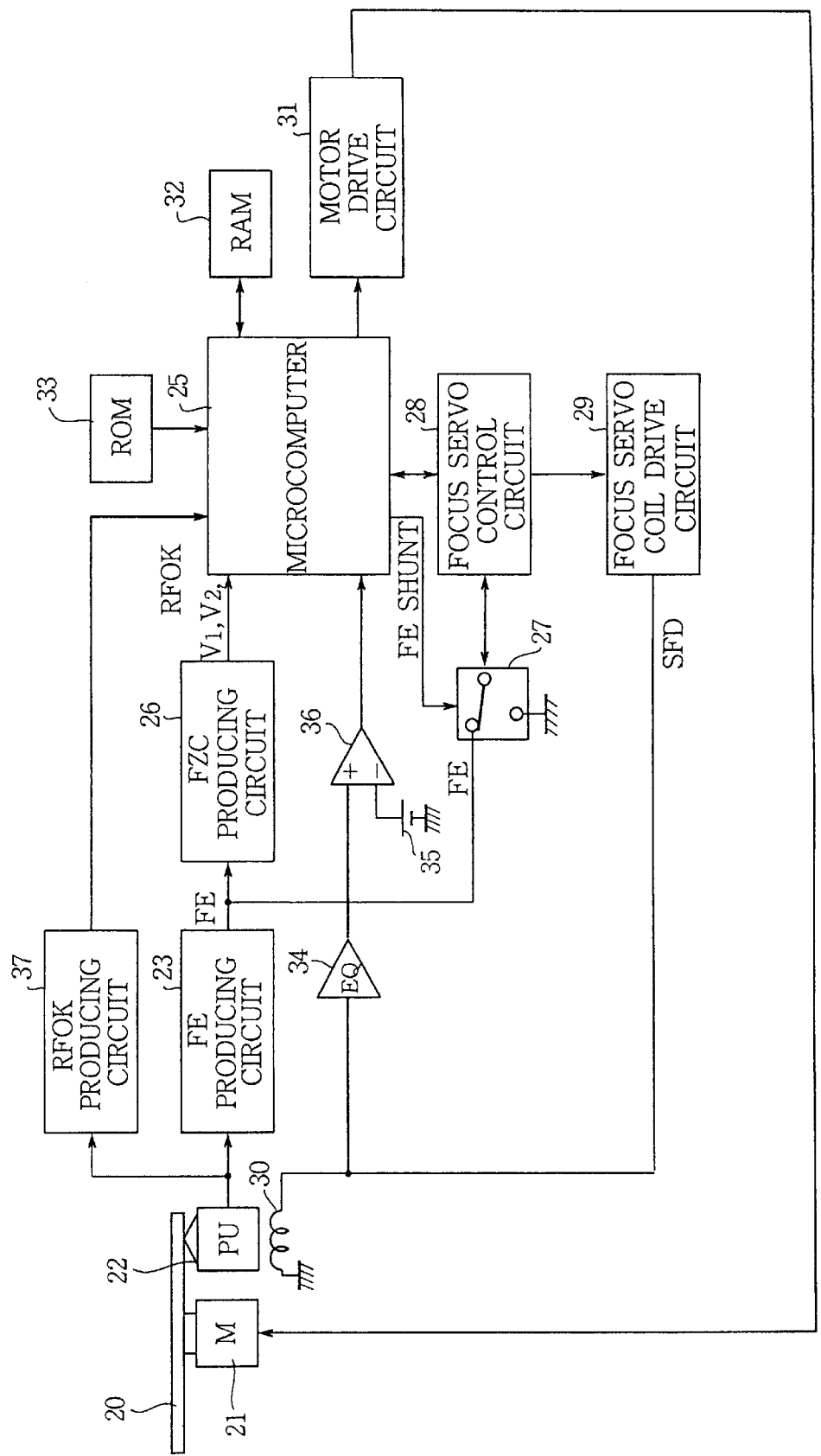
FIG. 4 is a block diagram showing an optical disc discriminating system employed for second and third embodiments of the present invention.

FIG. 4 shows a system employed for second and third embodiments. In the system, an equalizer (EQ) 34 for correcting the drive voltage applied to the actuator coil 30, and a comparator 36 having a reference voltage source 35 as a reference voltage for detecting voltage are provided, and the peak holding circuit 24 of the first embodiment is omitted. Other structures are the same as those of the first embodiment, and the same parts are identified with the reference numerals as FIG. 1, and the descriptions thereof are omitted.

The EQ 34 is operated for linearly holding a relationship between the drive voltage of the actuator coil 30 and the position of the lens. An output voltage of the EQ 34 is applied to an input terminal of the comparator 36 and the other input terminal is connected to the reference voltage source 35.

Figure 5:
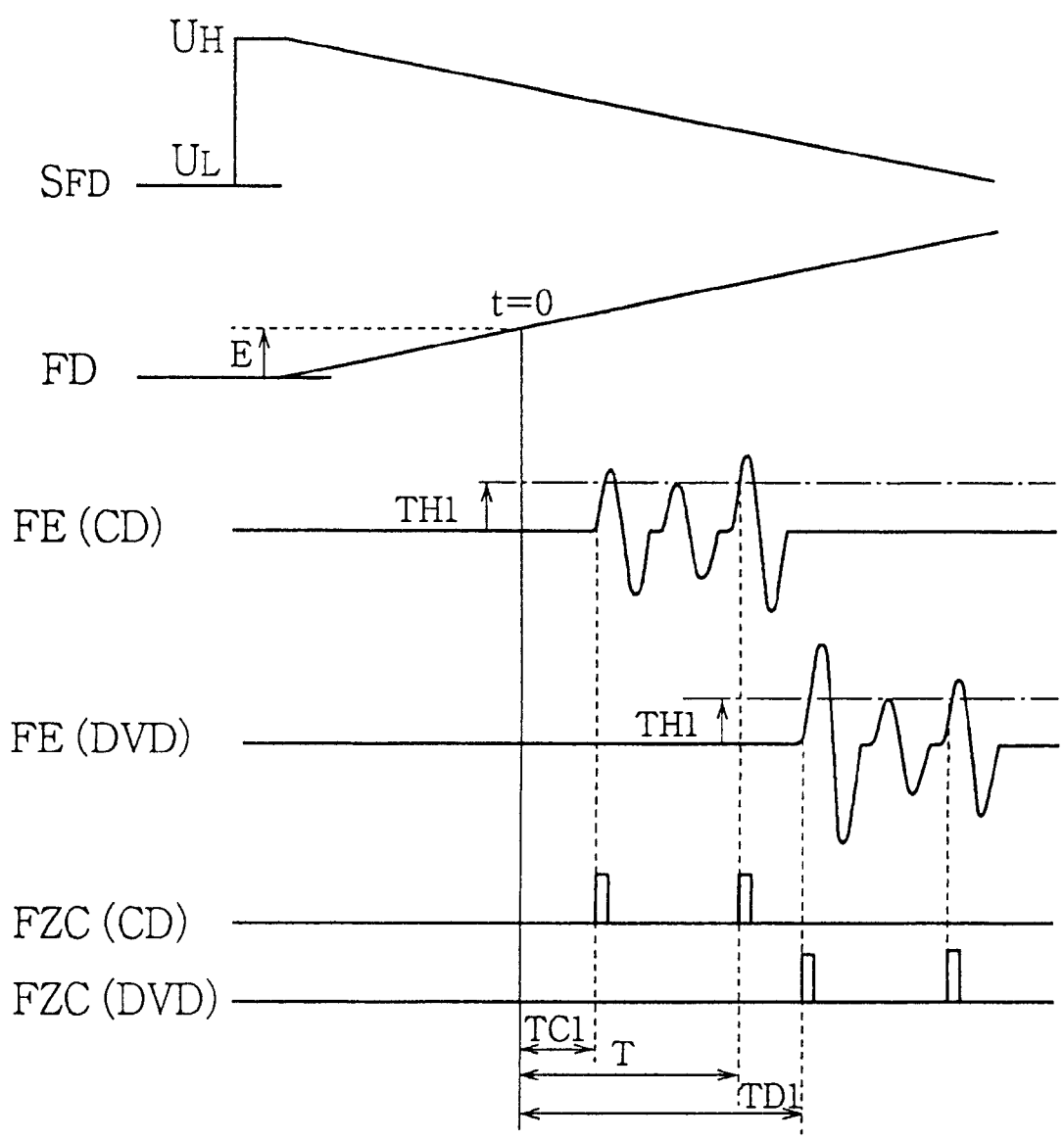
FIGS. 5a and 5b are time charts showing signals for explaining operations of the second and third embodiments.
Figure 5:
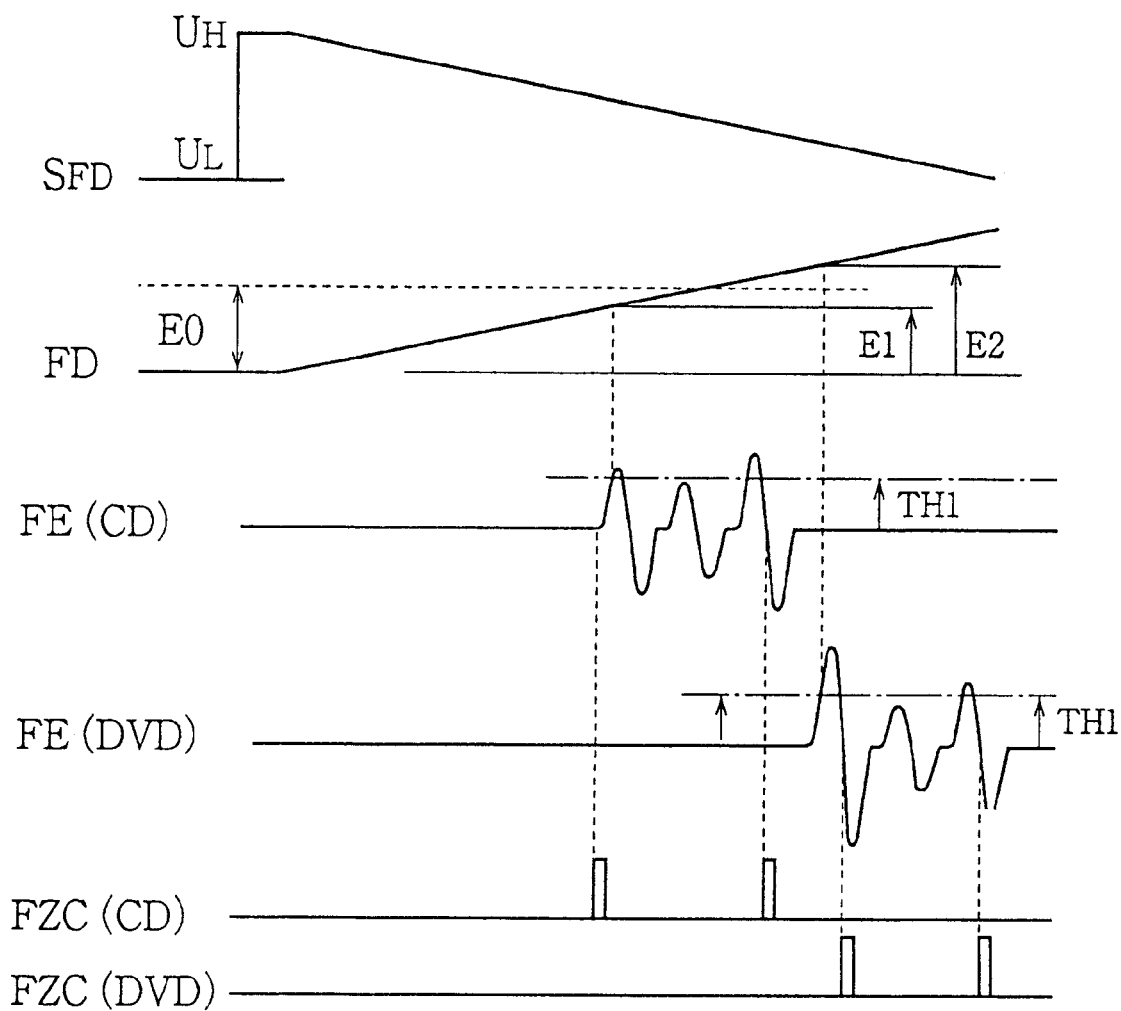

FIGS. 5a and 5b show signals for operating the system for second and third embodiments. A mark FD is a focus drive voltage of the drive voltage of the actuator coil 30 converted by the EQ 34. The FD is linearly changed with respect to the position voltage SFD.

In FIG. 5a, if the lens is further lowered from the position where the reference voltage E is obtained, times when the S-shaped signals are produced first by the pickup 22 by the respective DVD and CD are different from each other. Therefore, a mark TD1 is a detecting time of the DVD and a mark TC1 is a detecting time of the CD. The detecting times TD1 and TC1 are stored in the ROM 33 as set values.

In FIG. 5b, the FD produced at the detecting time TD1 or TC1 is stored in the ROM 33 as a set value. Marks E1 and E2 are voltages thereof.

Figure 6:
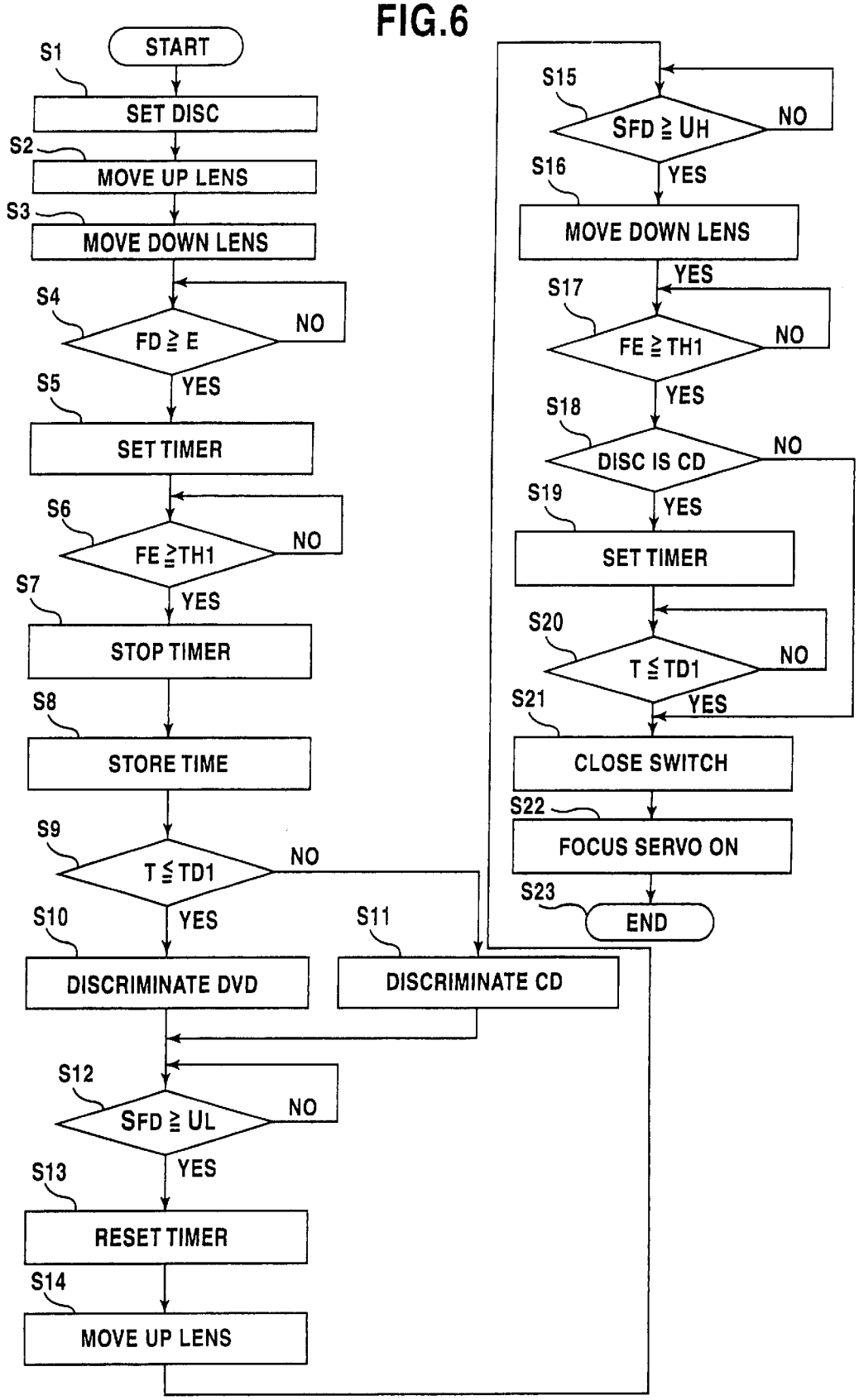
FIG. 6 is a flowchart showing an operation of the second embodiment.

The operation of the system of the second embodiment will be described with reference to FIG. 6.

At a step S1, the disc 20 is loaded on the disc player. At a step S2, the lens is moved up to the highest position UH. At a step S3, the lens is moved down from the highest position UH to the lowest position UL at a predetermined set speed.

At a step S4, the FD is monitored, and when $FD \geq E$, the timer is set at a step S5. At a step S6, an S-shaped signal detected first is monitored by the FZC. When $EF \geq TH1$, the timer is stopped at a step S7. At a step S8, the time during the timer is set is stored in the RAM 32. At a step S9, the time T is compared to the set time TD1 stored in the ROM 33. The time T is set to TC1<T<TD1. If $T \leq TD1$, it is determined that the disc is DVD at a step S10. If not, it is determined that the disc is CD at a step S11.

Figure 3:
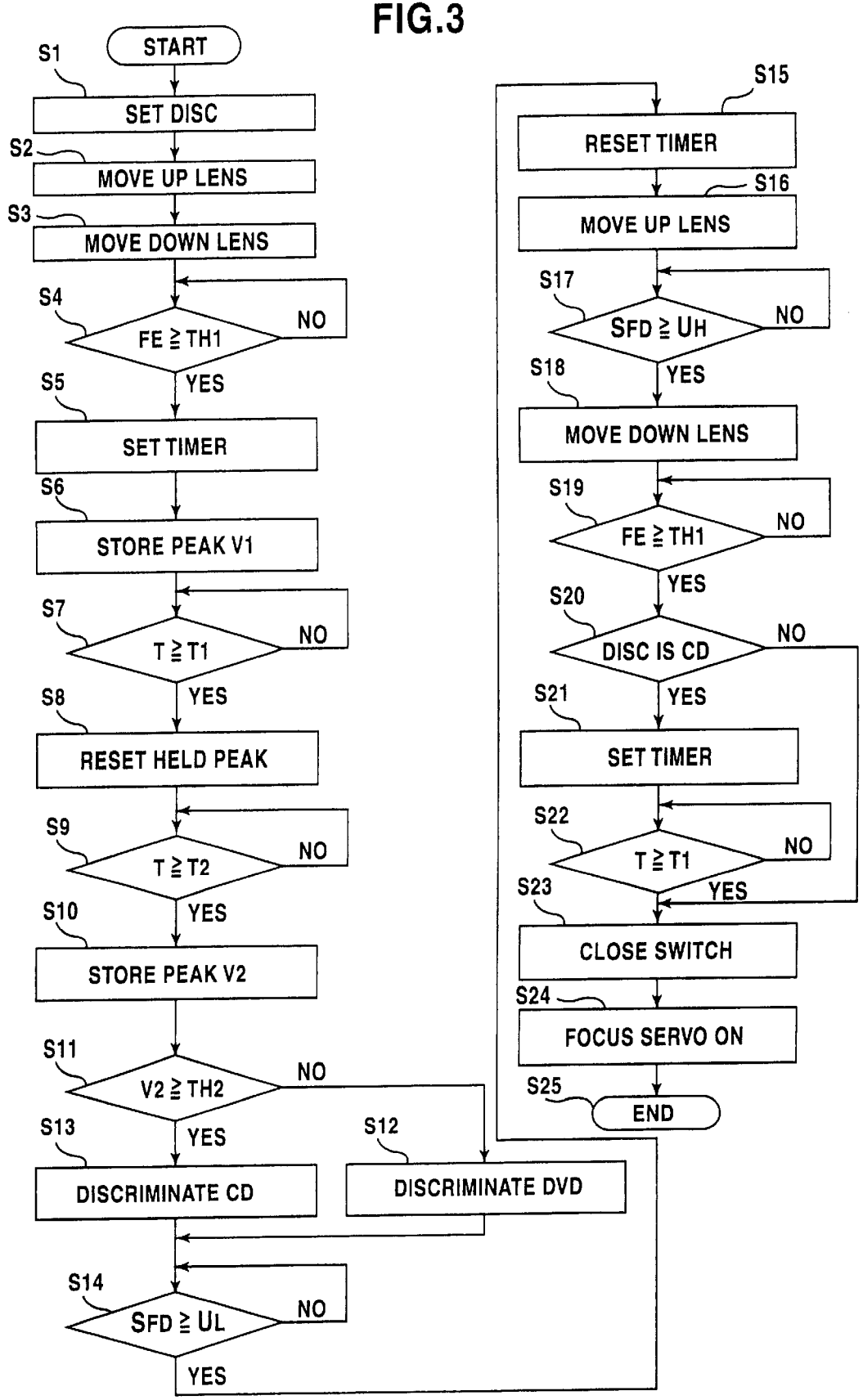
FIG. 3 is a flowchart showing an operation of the system.

Programs in steps S12 to S23 are the same as those in the steps S14 to S25 of FIG. 3 of the first embodiment. Thus, the descriptions thereof are omitted.

Figure 7:
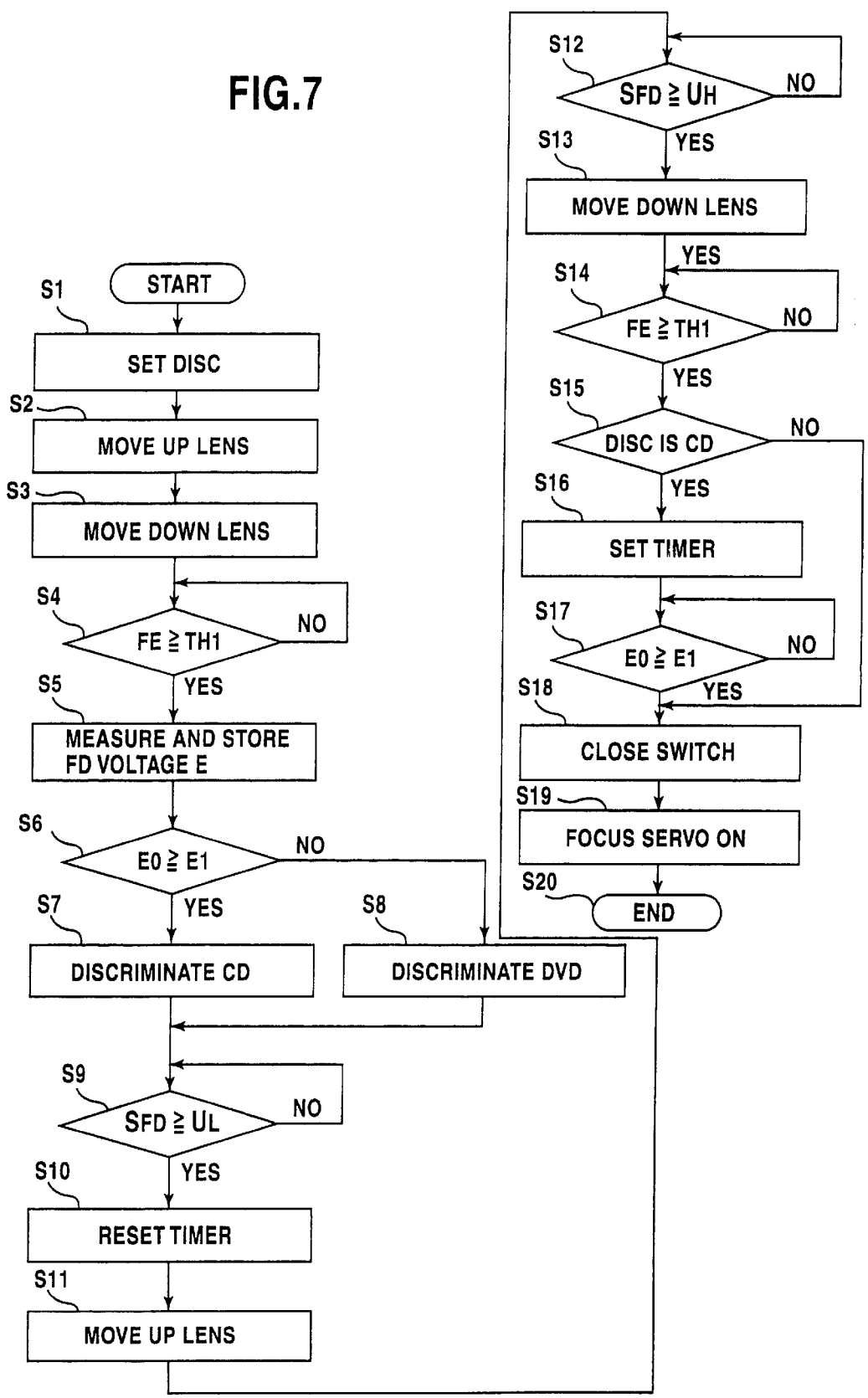
FIG. 7 is a flowchart showing an operation of the third embodiment.

The operation of the system of the third embodiment will be described with reference to FIG. 7.

At a step S1, the disc 20 is loaded on the disc player. At a step S2, the lens is moved up to the highest position UH. At a step S3, the lens is moved down from the highest position UH to the lowest position UL at a predetermined set speed. At a step S4, the S-shaped signal obtained first is monitored by the FZC until the FE exceeds the threshold TH1. When $FE \geq TH1$, the FD is stored in the RAM 32 at a step S5.

At a step S6, the FD (E1 or E2) stored in the RAM 32 is compared with a reference voltage E0 stored in the ROM 33. The reference voltage E0 is set to the value to meet E1<E0<E2. When $E0 \geq E1$, it is determined that the disc is CD at a step S7. If not, it is determined that the disc is DVD at a step S8.

Programs in steps S9 to S20 are the same as those in the steps S14 to S25 of FIG. 3 of the first embodiment. Thus, the descriptions thereof are omitted.

In the second and third embodiments, the FZC of the zero-order spectrum for monitoring the programs may be effective by the RFOK signal shown in FIG. 2g of the first embodiment, or by the peak voltage output exceeds the TH1.

As aforementioned, the lens may be moved from the lowest position to the highest position.

The EQ 34 is provided for removing noises of the high frequency range of the focus drive signal. If there is no noises, the EQ 34 may be omitted.

In order to prevent influences of inclination and vibration of the disc, the disc may be rotated at a predetermined speed at the step S2.

In accordance with the present invention, in the first embodiment, the objective lens for focusing the beam on the disc is moved from the predetermined position, thereby obtain the focus error signal. When the first focus error signal appears, the time is measured. When the time becomes the predetermined time, the level of the focus error signal at the predetermined time is compared with a set reference level. Thus, it is possible to discriminate CD and DVD, and to focus in the proper S-shaped signal in accordance with the level of the focus error signal and the measured time.

Furthermore, in the second and third embodiments, when the first focus error signal appears, the focus drive voltage is detected. The detected focus drive voltage is compared with the reference voltage and the time for detecting the voltage is compared with a reference time. Thus, it is possible to discriminate CD and DVD, and to focus in the proper S-shaped signal in accordance with the focus drive voltage and the measured time.

While the invention has been described in conjunction with preferred specific embodiment thereof, it will be understood that this description is intended to illustrate and not limit the scope of the invention, which is defined by the following claims.

What is claimed is:

1. A method for discriminating at least two kinds of optical discs which are different in thickness, in an optical disc player having an optical pickup (22), a focus error producing circuit (23) and a focus servo coil drive circuit (29), comprising the steps of:

moving the pickup toward an optical disc to a first predetermined position (UH) along an optical axis of the pickup;

irradiating a laser beam from the pickup on a recording surface of the optical disc;

moving the pickup toward a second predetermined position (UL) from the first predetermined position at a predetermined set speed;

receiving a laser beam reflected from said recording surface and producing a focus error signal (FE);

starting to count a time (T) from when a focus drive voltage of the focus servo coil drive circuit becomes equal with a predetermined voltage (E);

detecting a difference between the time when a value of the focus error signal becomes equal with a predetermined value (TH1) and a predetermined time (TD1), and discriminating the kind of the disc based on the detected difference which is different in accordance with the kinds of discs.

2. A method for discriminating at least two kinds of optical discs which are different in thickness, in an optical disc player having an optical pickup (22), a focus error producing circuit (23) and a focus servo coil drive circuit (29), comprising the steps of:

moving the pickup toward an optical disc to a first predetermined position (UH) along an optical axis of the pickup;

irradiating a laser beam from the pickup on a recording surface of the optical disc;

moving the pickup toward a second predetermined position (UL) from the first predetermined position at a predetermined set speed;

receiving a laser beam reflected from said recording surface and producing a focus error signal (FE);

detecting a difference between a focus drive voltage (E) of the focus servo coil drive circuit when a value of the focus error signal becomes equal with a reference value (TH1) and a reference voltage (E1), and discriminating the kind of the disc based on the detected difference which is different in accordance with the kinds of discs.

\* \* \* \* \*